(12) United States Patent
Nakanishi et al.

(10) Patent No.: US 12,045,559 B2
(45) Date of Patent: Jul. 23, 2024

(54) APPARATUS, METHOD, AND PROGRAM FOR GENERATING A TABLE OF CONTENTS FROM TREE-STRUCTURED DATA

(71) Applicant: Nippon Telegraph and Telephone Corporation, Tokyo (JP)

(72) Inventors: Koki Nakanishi, Musashino (JP); Nagatoshi Nawa, Musashino (JP); Haruo Oishi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/012,080

(22) PCT Filed: Jun. 24, 2020

(86) PCT No.: PCT/JP2020/024919
§ 371 (c)(1),
(2) Date: Dec. 21, 2022

(87) PCT Pub. No.: WO2021/260866
PCT Pub. Date: Dec. 30, 2021

(65) Prior Publication Data
US 2023/0244851 A1    Aug. 3, 2023

(51) Int. Cl.
*G06F 40/137* (2020.01)
*G06F 9/445* (2018.01)
*G06F 40/14* (2020.01)

(52) U.S. Cl.
CPC ............ *G06F 40/137* (2020.01); *G06F 9/445* (2013.01); *G06F 40/14* (2020.01)

(58) Field of Classification Search
CPC ......... G06F 40/137; G06F 40/14; G06F 9/445
See application file for complete search history.

(56) References Cited

U.S. PATENT DOCUMENTS 5,038,316 A * 8/1991 Hempleman ............. G06F 8/73
715/205
9,047,168 B2 * 6/2015 Shivananda .............. G06F 8/73
(Continued)

FOREIGN PATENT DOCUMENTS

JP          2013073471          4/2013

OTHER PUBLICATIONS

Futamura et al., "Design and implementation of programs by problem analysis diagram (PAD)," Information Processing Society of Japan, Jul. 1980, 21(4):259-267 (with Machine translation).

(Continued)

*Primary Examiner* — Alvin H Tan
(74) *Attorney, Agent, or Firm* — Fish & Richardson P.C.

(57) ABSTRACT

A generation device extracts elements from tree-structured data in which each element includes the content of an operation of an object device and an execution condition of the operation, in order from top to bottom. The generation device determines whether the operation is executed by referring to the state of the object device and determining whether the execution condition is satisfied, for an element including the execution condition, of the extracted elements. The generation device adds, to a list, information about the operation determined to be executed.

14 Claims, 11 Drawing Sheets

(56) References Cited

U.S. PATENT DOCUMENTS 10,296,445 B2 * 5/2019 Lau .......................... G06F 11/30
10,606,727 B2 * 3/2020 Apkon .................... G06F 9/451

OTHER PUBLICATIONS

Nakanishi et al.. , "Proposal of consistency check function and feedback function with setting procedure manual in network setting operation," IEICE Technical Report, 2019, 119(299):45-49 (with Machine translation).

* cited by examiner

TABLE OF CONTENTS
1. xxxx (SEQUENTIAL)
2. xxxx (SELECTION CONDITION Q)
   2.1. xxx CASE1
3. xxxxx (SEQUENTIAL)

APPARATUS, METHOD, AND PROGRAM FOR GENERATING A TABLE OF CONTENTS FROM TREE-STRUCTURED DATA

CROSS-REFERENCE TO RELATED APPLICATIONS

This application is a National Stage application under 35 U.S.C. § 371 of International Application No. PCT/JP2020/024919, having an International Filing Date of Jun. 24, 2020.

The disclosure of the prior application is considered part of the disclosure of this application, and is incorporated by reference in its entirety into this application.

TECHNICAL FIELD

The present invention relates to a generation device, a generation method, and a generation program.

BACKGROUND ART

Conventionally, tools and wizards that assist the creation of manuals for explaining operation procedures of computers and the like have been known. For example, when a conventional manual creation tool is used, a creator first composes a table of contents including chapters, sections, subsections, or the like according to the operation flow. At that time, if the operations are complicatedly branched according to the type or state of an object device, the creator composes the table of contents with reference to a flowchart. Further, for example, a conventional wizard creates navigation software based on a flowchart.

In addition, as the method for describing operation flow in a procedure manual and the like, a flowchart is generally used. On the other hand, as the notation for describing program flow similar to the flowchart, there is the problem analysis diagram (Pad diagram) (for example, see Non-Patent Literature 2). The Pad diagram is a method for describing the logic of a program using a drawing having two-dimensional tree structure.

Generally, the procedure manual is written in such a manner that operation log screens are pasted on the procedure manual according to the operation flow. For example, Non-Patent Literature 1 proposes a method for developing operation screens attached to the procedure manual into a tree structure according to the structure of the table of contents and displaying the current state of advancement in an operator's work. This method is based on the premise that all the operation screens appearing on the procedure manual are to be operated.

CITATION LIST

Non-Patent Literature

Non-Patent Literature 1: Koki Nakanishi, Nagatoshi Nawa, Takeshi Masuda, Haruo Oishi, Hiroyuki Nakamura, "Proposal of consistency check function and feedback function with operation log and setting procedure manual in network setting operation", IEICE Technical Report Vol. 119, No. 299, ICM2019-29, 2019.

Non-Patent Literature 2: Yoshihiko Futamura, Toshio Kawai, et al., "Design and Implementation of Programs by Problem Analysis Diagram (Pad)", Transactions of Information Processing Society of Japan, Vol. 21 No 4, pp 259-267, July 1980.

SUMMARY OF THE INVENTION

Technical Problem

However, the conventional method has a problem that creating the table of contents of a manual in an easy-to-understand manner may be difficult. For example, in the conventional method, the creation of the table of contents referring to a flowchart is performed by a creator's personal work, and therefore the table of contents may be difficult for readers to understand.

In the procedure manual, the operations may be branched depending on the state of each device, and the operations to be executed may be divided. In general, a flowchart is used in a work in which branching occurs. However, readers are required to keep in mind the flowchart and associate appropriate points with each other to determine the correspondence between flowchart nodes and the table of contents of the procedure manual, which may cause operation omissions and operation errors.

Means for Solving the Problem

In order to solve the above-mentioned problems and achieve the purpose, a generation device includes an extraction unit configured to extract elements from tree-structured data including the content of an operation of an object device and an execution condition of the operation, in order from top to bottom, a determination unit configured to determine whether the operation is executed by referring to the state of the object device and determining whether the execution condition is satisfied, for an element including the execution condition, of the elements extracted by the extraction unit, and an addition unit configured to add, to a list, information about the operation determined to be executed by the determination unit.

Effects of the Invention

According to the present invention, the table of contents of a manual can be created in an easy-to-understand manner.

DESCRIPTION OF EMBODIMENTS

Hereinafter, embodiments of a generation device, a generation method, and a generation program according to the present application will be described in detail with reference to attached drawings. The present invention is not limited to the embodiments described below.

First Embodiment

Figure 1:
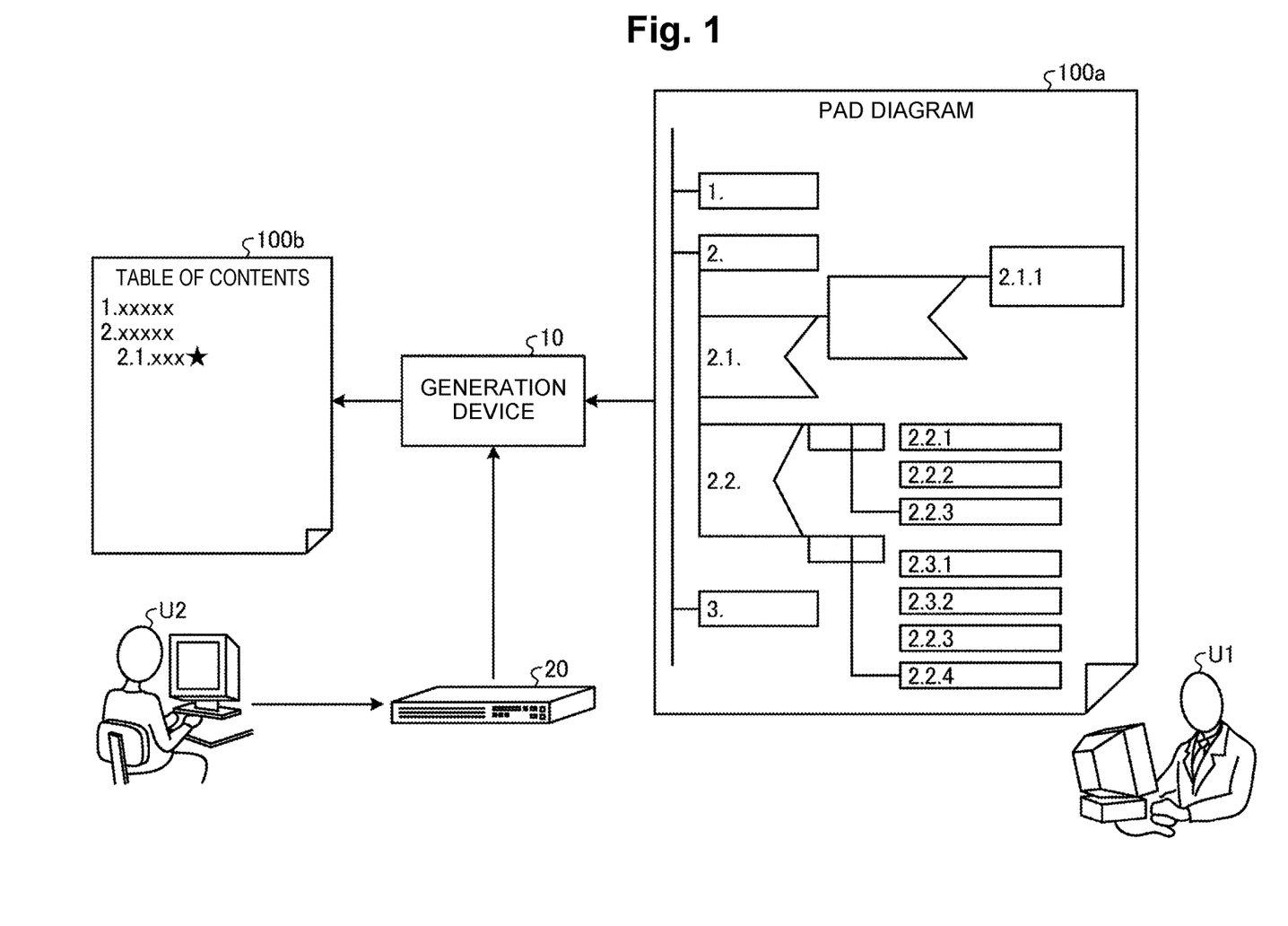
FIG. 1 is a diagram illustrating processing of a generation device according to a first embodiment.

First, the outline of processing of the generation device will be described with reference to FIG. 1. FIG. 1 is a diagram illustrating the processing of the generation device according to the first embodiment. As illustrated in FIG. 1, a generation device 10 accepts an input of a Pad diagram 100a. Further, the generation device 10 generates and outputs a table of contents 100b of a manual of an object device 20. The generation device 10 may generate not only the table of contents 100b but also manual contents.

For example, the Pad diagram 100a is the one illustrating an operation procedure of the object device 20, and is created by a user U1. For example, the object device 20 is a computer or the like. Further, a user U2 is an operator of the object device 20 and operates the object device 20 according to the manual including the table of contents 100b.

Here, the manual may be the one indicating a procedure for installing a predetermined program on the object device 20. In this case, the operation procedure may be changed depending on the program already installed on the object device 20 and the type (including version) of operating system (OS) running on the object device 20.

Therefore, if the manual matches the state of the object device 20, the user U2 can easily grasp the operation to be executed. For example, it will be easier in understanding when operating the object device 20 if the manual includes no description about the operation for installing the program already installed on the object device 20 or the operation required only for the OS not running on the object device 20.

The generation device 10 of the first embodiment generates the table of contents of the manual in an easy-to-understand manner according to the state of the object device 20. Hereinafter, the generation device 10 of the first embodiment will be described in detail below with respect to configuration/processing thereof.

Configuration of First Embodiment

Figure 2:
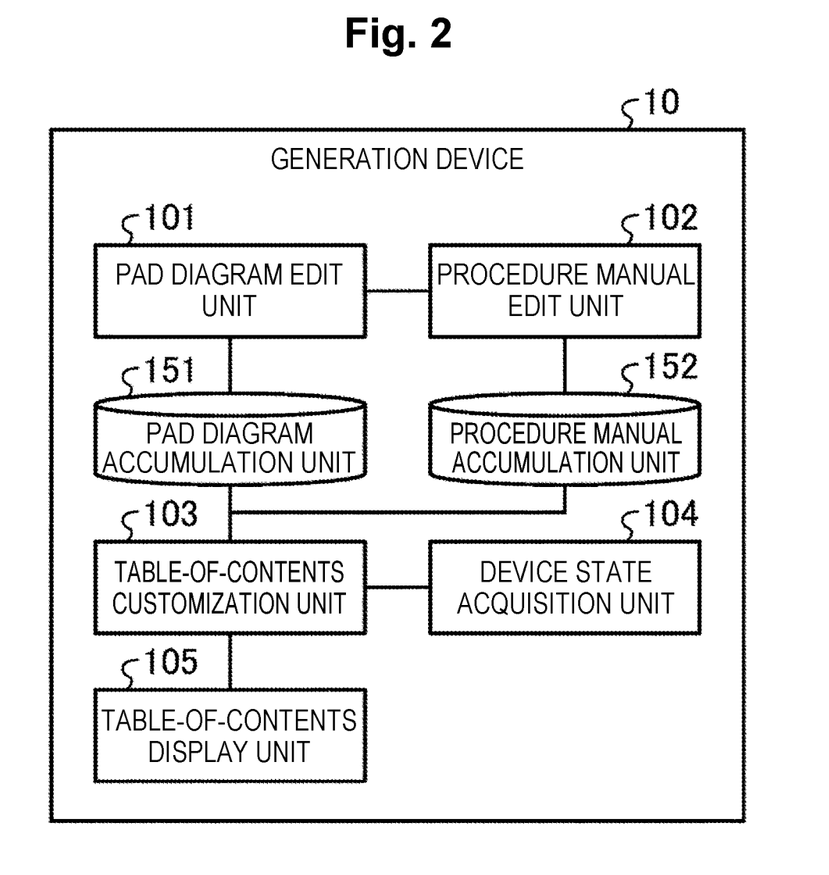
FIG. 2 is a diagram illustrating an exemplary configuration of the generation device according to the first embodiment.

FIG. 2 is a diagram illustrating an exemplary configuration of the generation device according to the first embodiment. As illustrated in FIG. 2, the generation device 10 has a Pad diagram edit unit 101, a procedure manual edit unit 102, a table-of-contents customization unit 103, a device state acquisition unit 104 and a table-of-contents display unit 105. Further, the generation device 10 has a Pad diagram accumulation unit 151 and a procedure manual accumulation unit 152.

The Pad diagram edit unit 101 edits the Pad diagram 100a according to a user operation or the like. For example, the Pad diagram edit unit 101 accepts operations of the user U1. Further, the Pad diagram edit unit 101 can edit the Pad diagram 100a stored in the Pad diagram accumulation unit 151 and can store the edited Pad diagram 100a in the Pad diagram accumulation unit 151, again.

The procedure manual accumulation unit 152 edits the manual according to a user operation or the like. For example, the procedure manual accumulation unit 152 accepts operations of the user U1. Further, the procedure manual accumulation unit 152 can edit manuals stored in the procedure manual accumulation unit 152, and can store the edited manuals in the procedure manual accumulation unit 152 again. The table of contents of the manual of the procedure manual accumulation unit 152 may be the one generated by the table-of-contents customization unit 103.

The table-of-contents customization unit 103 generates the table of contents 100b of the manual based on the Pad diagram 100a and the state of the object device 20 acquired by the device state acquisition unit 104. The table-of-contents display unit 105 causes a display device such as a display to display the table of contents 100b generated by the table-of-contents customization unit 103.

The processing for generating the table of contents 100b performed by the table-of-contents customization unit 103 will be described below. Here, it is assumed that the Pad diagram 100a is tree-structured data and the operation to be executed earlier is described as an upper element. The table-of-contents customization unit 103 extracts elements from the Pad diagram 100a in which each element includes the content of an operation of the object device 20 and an execution condition of the operation, in order from top to bottom. For example, the table-of-contents customization unit 103 extracts elements from the Pad diagram 100a. In the execution condition, the content of a following operation branches because the Pad diagram 100a is tree-structured data. Therefore, in the following description, the execution conditions may be referred to as branch conditions.

The Pad diagram 100a includes sequential elements and selection elements (branch elements). The operation of each sequential element is executed regardless of the state of the object device 20. On the other hand, the operation of each selection element depends on the state of the object device 20 in determining whether it is executed.

Figure 3:
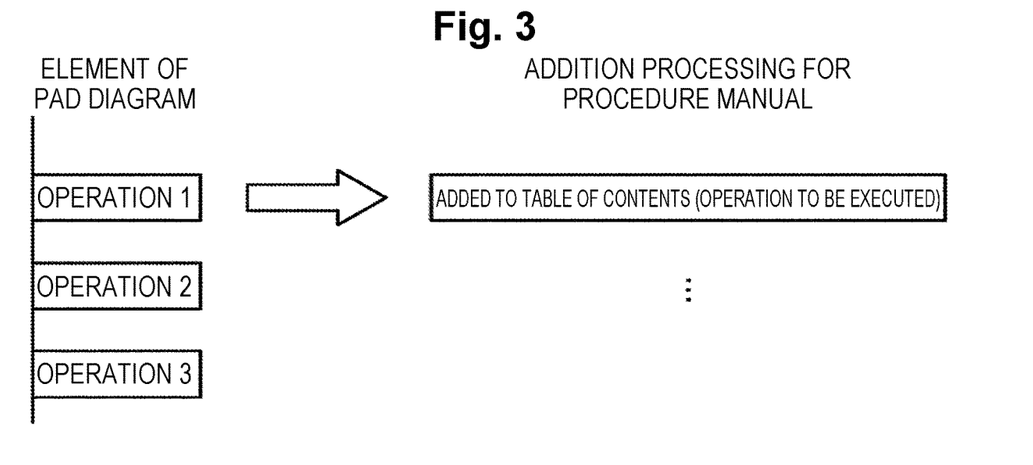
FIG. 3 is a diagram illustrating sequential element addition processing.

FIG. 3 is a diagram illustrating sequential element addition processing. As illustrated in FIG. 3, no branch condition relating to the state of the object device 20 is given to the operation of a sequential element. Regarding the sequential elements, operations written in rectangles are performed by the user U2 in order from top to bottom. The table-of-contents customization unit 103 adds the operation included in the sequential element to the table of contents 100b.

The table-of-contents customization unit 103 determines whether the operation is executed by referring to the state of the object device 20 and determining whether the execution condition is satisfied, for the element including the execution condition, of the extracted elements.

Here, the Pad diagram may include a description of the flow of program processing. In this case, an element of the Pad diagram includes the content of the program processing and an execution condition for executing the processing. In the present embodiment, the generation device 10 regards the contents of the program processing and execution conditions for executing the processing in the Pad diagram, as operation contents of the object device 20 and execution conditions for executing the operations, respectively. For example, the table-of-contents customization unit 103 regards the content of the processing of the extracted element as the content of the operation, regards the condition for executing the processing of the extracted element as an execution condition, and, for the element including the execution condition, determines whether the operation is executed by referring to the state of the object device 20 and determining whether the execution condition is satisfied.

Figure 4:
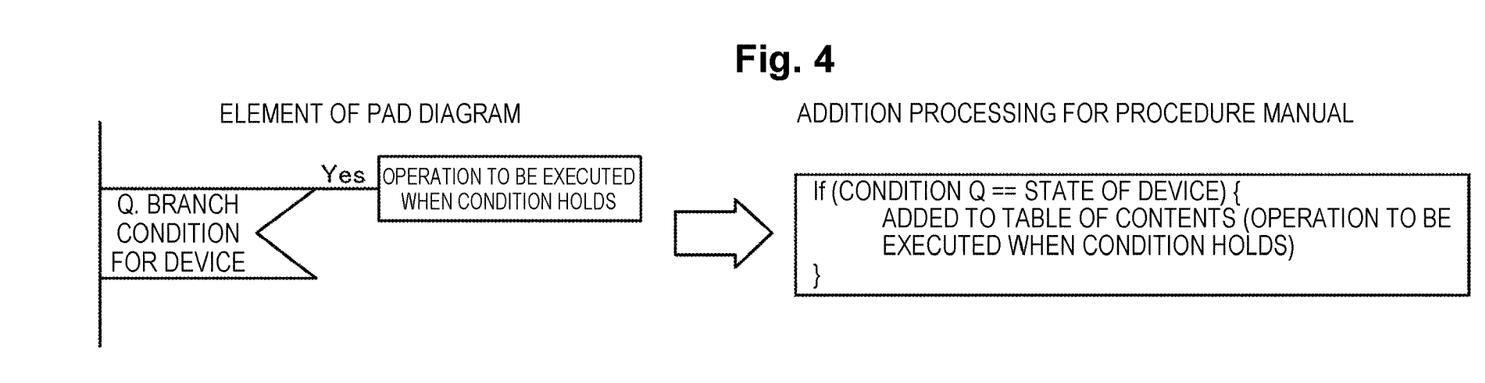
FIG. 4 is a diagram illustrating selection element addition processing.
Figure 5:
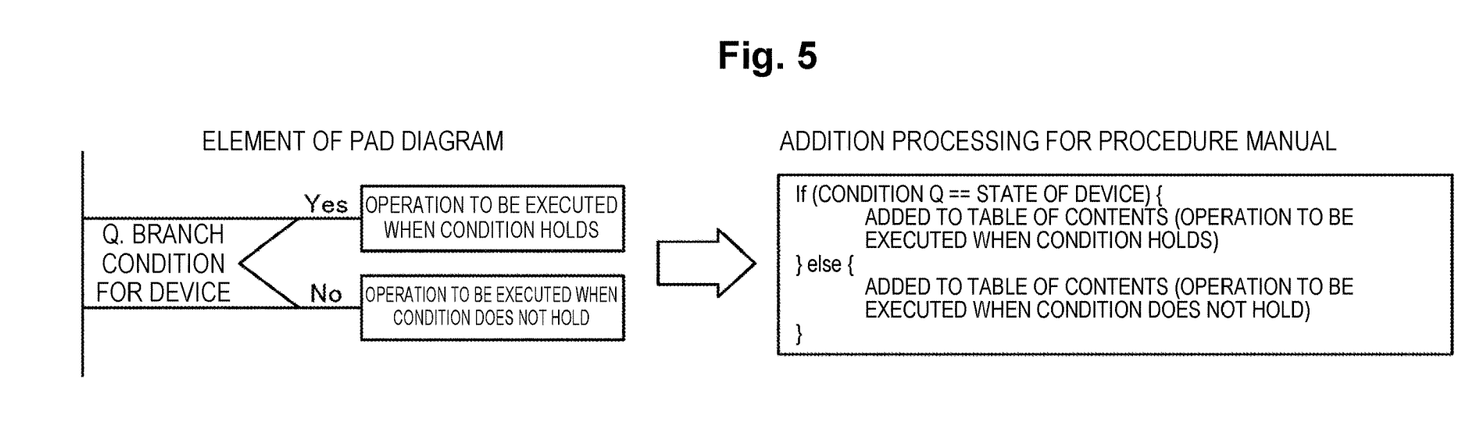
FIG. 5 is a diagram illustrating selection element addition processing.
Figure 6:
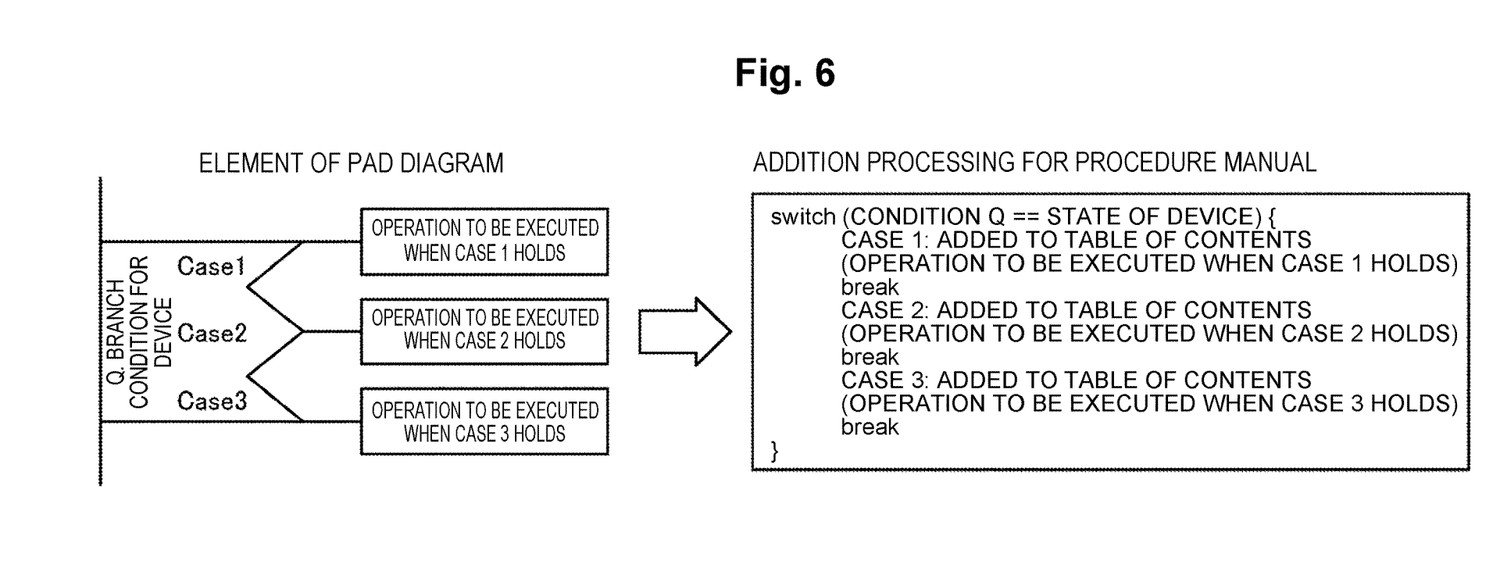
FIG. 6 is a diagram illustrating selection element addition processing.

FIG. 4, FIG. 5 and FIG. 6 are diagrams illustrating selection element addition processing. The selection elements are classified into multiple types. Here, the selection element types are a "branch A", a "branch B", and a "branch C", and description is given below for each type.

The "branch A" includes an operation to be executed either when a branch condition relating to the state of the object device 20 is satisfied or when the branch condition is not satisfied. The element of the Pad diagram 100a illustrated in FIG. 4 is classified into the "branch A". In the example of FIG. 4, an operation to be executed when the condition holds is described in the Pad diagram 100a. In this case, for example, when the state of the object device 20 acquired by the device state acquisition unit 104 meets a condition "Q", the table-of-contents customization unit 103 adds the operation described in the Pad diagram 100a to the table of contents 100b. As illustrated in FIG. 4, the "branch A" can be expressed by an "If" statement that includes no "else" statement.

The "branch B" includes an operation to be executed for each case of when a branch condition relating to the state of the object device 20 is satisfied and when the branch condition is not satisfied. The element of the Pad diagram 100a illustrated in FIG. 5 is classified into the "branch B". In the example of FIG. 5, the operation to be executed when the condition holds and the operation to be executed when the condition does not hold are described in the Pad diagram 100a. In this case, for example, when the state of the object device 20 acquired by the device state acquisition unit 104 meets the condition "Q", the table-of-contents customization unit 103 adds the operation described in the Pad diagram 100a, which is to be executed when the condition holds, to the table of contents 100b. On the other hand, when the state of the object device 20 acquired by the device state acquisition unit 104 does not meet the condition "Q", the table-of-contents customization unit 103 adds the operation described in the Pad diagram 100a, which is to be executed when the condition does not hold, to the table of contents 100b. Further, as illustrated in FIG. 5, the "branch B" can be expressed by an "If-else" statement.

The "branch C" includes an operation to be executed when each of multiple branch conditions relating to the state of the object device 20 is satisfied. The element of the Pad diagram 100a illustrated in FIG. 6 is classified into the "branch C". In the example of FIG. 6, operations to be executed respectively when the multiple conditions hold are described in the Pad diagram 100a. In this case, for example, the table-of-contents customization unit 103 checks whether the state of the object device 20 acquired by the device state acquisition unit 104 meets any one of "Case 1", "Case 2", and "Case 3" of the condition "Q", and adds the operation corresponding to each "Case" to the table of contents 100b. In this case, the condition "Q" may be a set of multiple values, and "Case 1", "Case 2", and "Case 3" may correspond to these multiple values, respectively. Further, as illustrated in FIG. 6, the "branch C" can be expressed by a "Switch" statement.

The table-of-contents customization unit 103 adds information about the operation determined to be executed to a list. The table-of-contents customization unit 103 adds, to the table of contents 100b of the manual, the information about the operation determined to be executed and information about the operation to be executed regardless of the state of the object device 20.

As illustrated in FIGS. 3 to 6, the figure in the Pad diagram is different between the sequential processing and the selection processing. For example, as illustrated in FIG. 3, the sequential processing is represented by rectangles. On the other hand, as illustrated in FIG. 4, the "branch A" is represented by the figure in which a rectangle is added to a pentagon having a concave angle. Further, as illustrated in FIG. 5, the "branch B" is represented by the figure in which two rectangles are added to a pentagon having a concave angle. Further, as illustrated in FIG. 6, the "branch C" is represented by the figure in which three or more rectangles are added to a heptagon having concave angles. In generalization, the "branch C" is represented by the figure in which (n–4) rectangles are added to an n-sided polygon (n>7) having concave angles. The table-of-contents customization unit 103 can determine whether the element is a sequential element or a selection element based on the shape of the figure.

Further, for example, the table-of-contents customization unit 103 may determine it as the "branch A" if the number of branches being condition destinations in the Pad diagram is one, determine it as the "branch B" if the number of branches is two, and determine it as the "branch C" if the number of branches is three or more.

For example, the table-of-contents customization unit 103 adds the operations of all sequential elements and the operations of the selection elements determined to be executed to the table of contents 100b while maintaining the order in the Pad diagram. On the other hand, the table-of-contents customization unit 103 does not add the operations of the selection elements not determined to be executed to the table of contents 100b.

Figure 7:
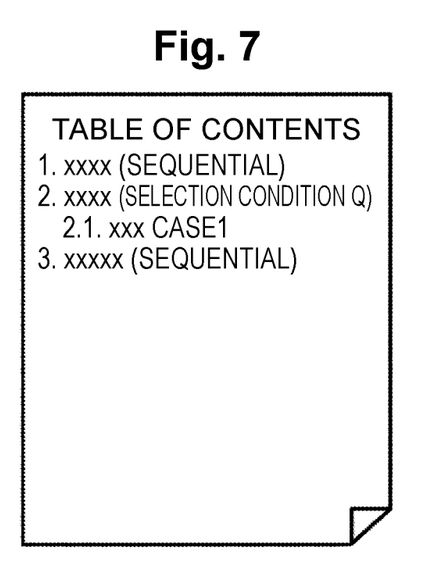
FIG. 7 is a diagram illustrating an exemplary table of contents.

FIG. 7 is a diagram illustrating an exemplary table of contents. As illustrated in FIG. 7, both of "1. xxxx" and "3. xxxx" are operations of sequential elements and therefore added to the table of contents 100b. On the other hand, "2. xxx" is a selection element to be classified into the "branch C", and only the operation of "Case 1" is added to the table of contents 100b but operations of and after "Case 2" are not added to the table of contents 100b.

Figure 8:
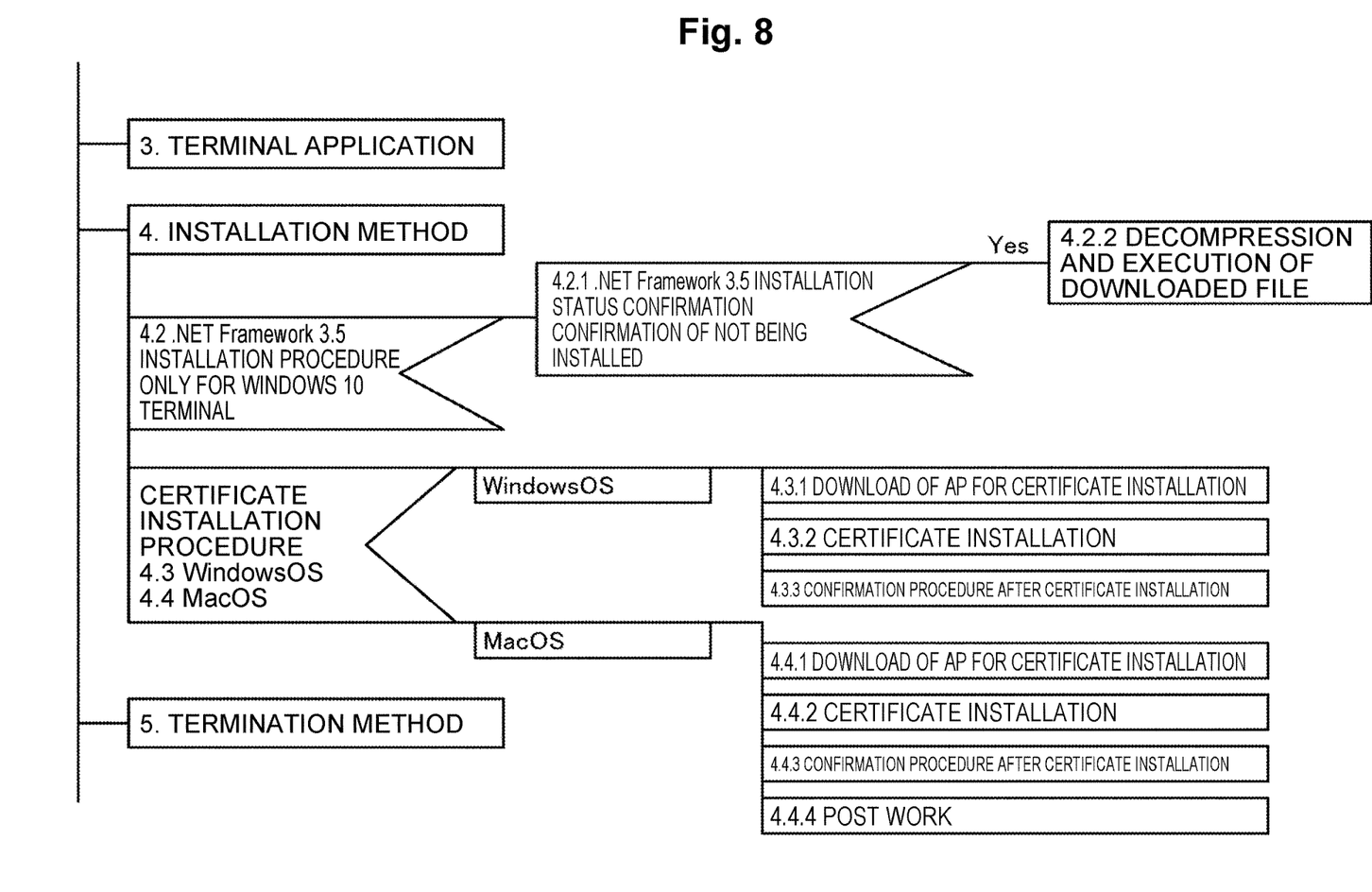
FIG. 8 is a diagram illustrating an exemplary Pad diagram.

FIG. 8 is a diagram illustrating an exemplary Pad diagram. In the example of FIG. 8, "3. Terminal application", "4. Installation method", and "5. Termination method" are sequential elements. However, "4. Installation method" has an element including a subordinate selection element.

Regarding a selection element "4.2.1 .NET Framework 3.5 Installation status confirmation; Confirmation of not being installed", the device state acquisition unit 104 confirms whether a program "NET Framework 3.5" is already installed on the object device 20. Then, if the program "NET Framework 3.5" is not installed on the object device 20, the table-of-contents customization unit 103 adds an operation "4.2.2 Decompression and execution of downloaded file" to the table of contents 100b.

In this manner, the table-of-contents customization unit 103 refers to whether a predetermined program is installed on the object device 20, and determines that an operation for installing the predetermined program is executed when the predetermined program is not installed on the object device 20.

Further, regarding a selection element "Certificate installation procedure; 4.3 WindowsOS; 4.4 MacOS" (Windows is a registered trademark), the device state acquisition unit 104 acquires the type of OS running on the object device 20. Then, if the OS running on the object device 20 is "WindowsOS", the table-of-contents customization unit 103 adds operations "4.3.1 Download of AP for certificate installation", "4.3.2 Certificate installation", and "4.3.3 Confirmation procedure after certificate installation" to the table of contents 100b. On the other hand, if the OS running on the object device 20 is "MacOS", the table-of-contents customization unit 103 adds operations "4.4.1 Download of AP for certificate installation", "4.4.2 Certificate installation", "4.4.3 Confirmation procedure after certificate installation", and "4.4.4 Post work" to the table of contents 100b.

For example, in the example of FIG. 8, in the case where the NET Framework 3.5 is not installed, "4.2.1 .NET Framework 3.5 Installation status confirmation; Confirmation of not being installed" corresponds to the execution condition determined to be satisfied. Further, "4.2.2 Decompression and execution of downloaded file" corresponds to an operation of a subordinate element of the execution condition. Further, for example, the information about the operation is a text indicating the execution condition or operation of each element described in the Pad diagram.

Figure 9:
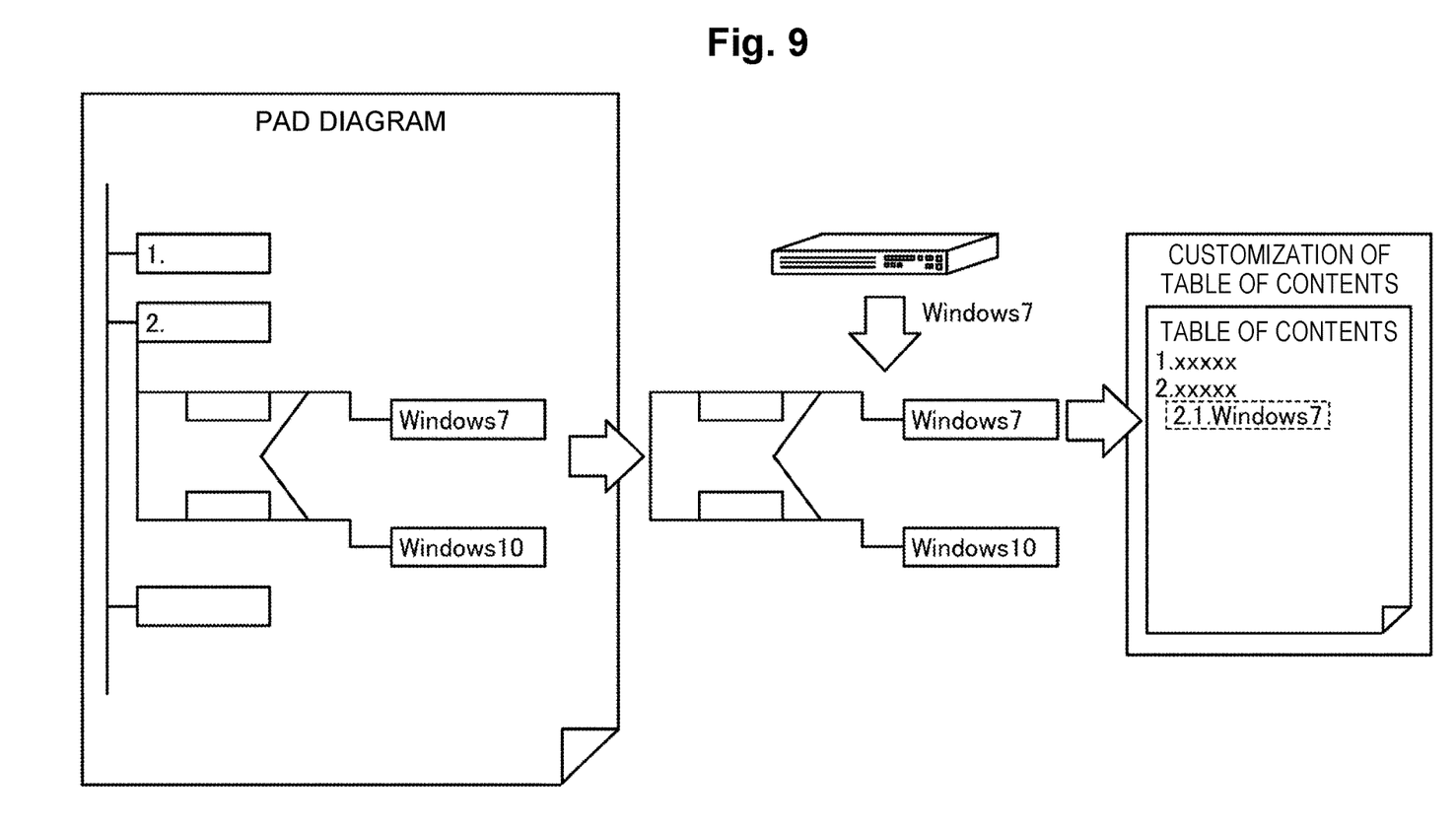
FIG. 9 is a diagram illustrating exemplary addition processing for table of contents.

FIG. 9 is a diagram illustrating an exemplary addition processing to table of contents. As illustrated in FIG. 9, the table-of-contents customization unit 103 refers to the type of OS running on the object device 20 and determines that an operation determined in advance for each type of the OS running on the object device 20 is executed. In the example of FIG. 9, the operation corresponding to Windows 7, which is the OS running on the object device 20, is added to the table of contents 100b.

Processing of First Embodiment

Figure 10:
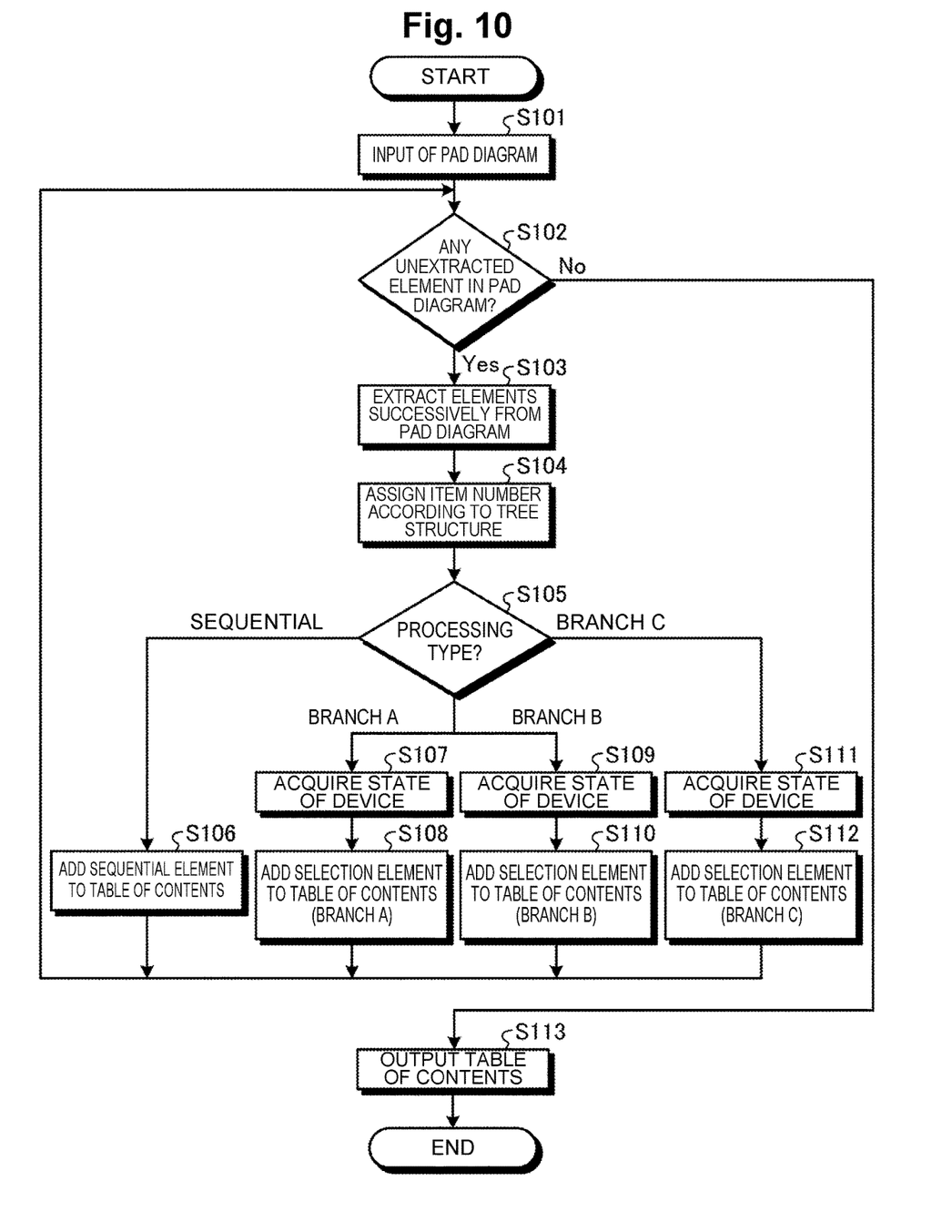
FIG. 10 is a flowchart illustrating processing flow of the generation device according to the first embodiment.

FIG. 10 is a flowchart illustrating processing flow of the generation device according to the first embodiment. As illustrated in FIG. 10, the table-of-contents customization unit 103 accepts the input of the Pad diagram (step S101).

When the Pad diagram includes any element that is not yet extracted ("Yes" in step S102), the table-of-contents customization unit 103 extracts elements successively from the Pad diagram (step S103). For example, the table-of-contents customization unit 103 extracts the elements in order from top to bottom of the Pad diagram.

Then, the table-of-contents customization unit 103 assigns an item number to the element extracted according to the tree structure of the Pad diagram (step S104). Here, the table-of-contents customization unit 103 determines the processing type of the extracted element (step S105). When the processing type is sequential ("sequential" in step S105), the table-of-contents customization unit 103 adds the sequential element to table of contents (step S106).

When the processing type is the "branch A" ("branch A" in step S105), the device state acquisition unit 104 acquires the state of the object device 20 (step S107). Then, the table-of-contents customization unit 103 adds the selection element to the table of contents 100b according to the acquired state of the object device 20 (step S108).

Similarly, when the processing type is the "branch B" ("branch B" in step S105), the device state acquisition unit 104 acquires the state of the object device 20 (step S109). Then, the table-of-contents customization unit 103 adds the selection element to the table of contents 100b according to the acquired state of the object device 20 (step S110).

Similarly, when the processing type is the "branch C" ("branch C" in step S105), the device state acquisition unit 104 acquires the state of the object device 20 (step S111). Then, the table-of-contents customization unit 103 adds the selection element to the table of contents 100b according to the acquired state of the object device 20 (step S112).

After the table-of-contents customization unit 103 completes the execution of step S106, S108, S110 or S112, the processing returns to step S102. Further, in step S102, when there is no unextracted element in the Pad diagram ("No" in step S102), the table-of-contents display unit 105 outputs the table of contents 100b (step S113).

Effects of First Embodiment

As described above, the table-of-contents customization unit 103 extracts elements from tree-structured data in which each element includes the content of an operation of the object device 20 and an execution condition of the operation, in order from top to bottom. The table-of-contents customization unit 103 determines whether the operation is executed by referring to the state of the object device 20 and determining whether the execution condition is satisfied, for the element including the execution condition, of the extracted elements. The table-of-contents customization unit 103 adds information about the operation determined to be executed to the list. In this manner, the generation device 10 automatically generates the table of contents of a manual from the Pad diagram. Further, even for the selection element, the generation device 10 can add only the operation according to the state of the object device to the table of contents. Therefore, according to the present embodiment, it is feasible to create the table of contents of the manual in an easy-to-understand manner.

The table-of-contents customization unit 103 extracts elements from the Pad diagram in which each elements includes the content of processing and a condition for executing the processing. The table-of-contents customization unit 103 regards the content of the processing of the extracted element as the content of the operation, regards the condition for executing the processing of the extracted element as the execution condition, and, for the element including the execution condition, determines whether the operation is executed by referring to the state of the object device 20 and determining whether the execution condition is satisfied. The table-of-contents customization unit 103 adds, to the table of contents of the manual, the execution condition determined to be satisfied, information about an operation of a subordinate element of the execution condition, and information about an operation to be executed regardless of the state of the object device 20. As a result, any operation that is not actually executed because of not satisfying the branch condition is not added to the table of contents. Therefore, according to the present embodiment, an operator is simply required to execute the operation indicated in the table of contents, without being forced to select the operation to be executed, and therefore the work efficiency can be improved.

The table-of-contents customization unit 103 determines the operation to be executed for the following first type element, the following second type element, and the following third type element, among the extracted elements. The first type element includes an operation to be executed either when a branch condition relating to the state of the object device 20 is satisfied or when the branch condition is not satisfied. The second type element includes an operation to be executed for each case of when a branch condition relating to the state of the object device 20 is satisfied and when the branch condition is not satisfied. The third type element includes an operation to be executed when each of multiple branch conditions relating to the state of the object device 20 is satisfied. In this manner, the generation device 10 can distinguish between multiple types of selection elements. Thus, according to the present embodiment, it is feasible to accurately determine the operation to be executed.

The table-of-contents customization unit 103 refers to whether a predetermined program is installed on the object device 20, and determines that an operation for installing the predetermined program is executed when the predetermined program is not installed on the object device 20. For example, if the predetermined program is already installed, the operation for installing this program is unnecessary and there is no necessity of listing it in the table of contents of the manual. Therefore, according to the present embodiment, useless operations can be removed from the table of contents, and the work efficiency can be improved.

The table-of-contents customization unit 103 refers to the type of OS running on the object device 20, and determines that an operation determined in advance is executed for each type of OS running on the object device 20. For example, there is no necessity of listing the operation in the table of contents of the manual if the OS currently running needs not execute it. Therefore, according to the present embodiment, useless operations can be removed from the table of contents, and the work efficiency can be improved.

System Configuration Etc.

Further, components of each illustrated device are functionally conceptual and are not always required to be physically arranged as illustrated in the drawings. That is, specific forms of respective devices with respect to distribution/integration are not limited to the illustrated examples, and the whole or a part of them may be functionally or physically distributed/integrated in arbitrary units, when they are arranged, according to various loads and usage conditions. Further, regarding respective processing functions performed by each device, the whole or an arbitrary part of them can be realized by a CPU and a program analyzed/executed by the CPU, or can be realized as hardware based on wired logic.

Further, regarding processing described in the present embodiment, the whole or a part of the processing described as being automatically performed can be also manually performed. Alternatively, the whole or a part of the processing described as being manually performed can be automatically performed using a conventionally known method. In addition, the processing procedure, the control procedure, specific names, and information including various data and parameters in the above document and drawings can be arbitrary changed unless otherwise mentioned.

Program

As an embodiment, the generation device 10 can be implemented by installing a generation program that executes the above-described management processing as packaged software or online software on a desired computer. For example, causing an information processing device to execute the above-described generation program enables the information processing device to function as the generation device 10. The information processing device referred to in this case includes a desktop type or notebook type personal computer. Further, other examples of the information processing device include mobile communication terminals such as smartphone, portable telephone, and personal handyphone system (PHS), and slate terminals such as personal digital assistant (PDA).

Further, in a case where terminal devices that users use are clients, the generation device 10 may also be implemented as a server that provides the clients with services relating to the above-described processing. For example, the server can be implemented as a server that provides generation services in which the input is a Pad diagram and the output is a table of contents of a manual. In this case, the server may be implemented as a web server, or may be implemented as a cloud that provides services relating to the above-described management processing by outsourcing.

Figure 11:
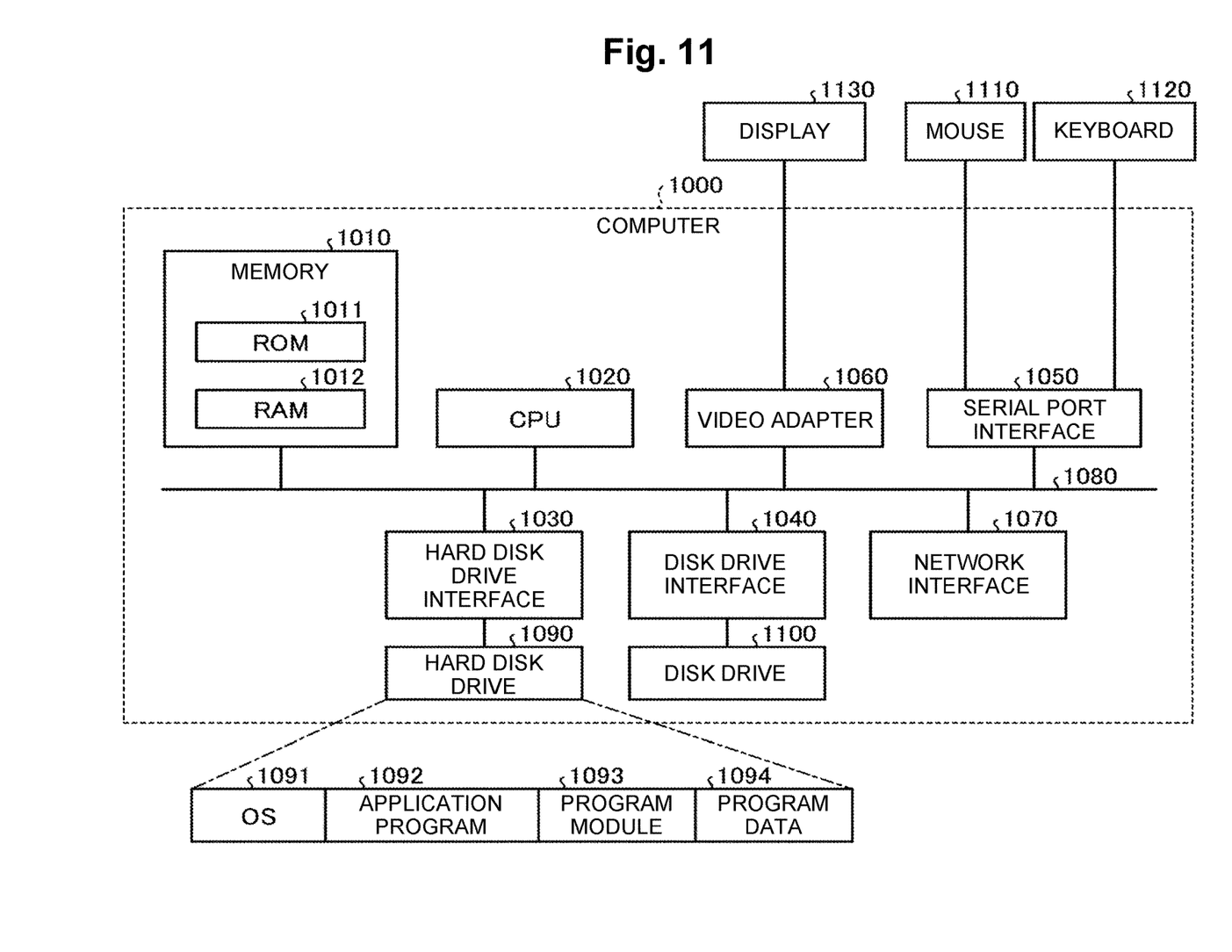
FIG. 11 is a diagram illustrating an exemplary computer that executes a generation program.

FIG. 11 is a diagram illustrating an exemplary computer that executes the generation program. A computer 1000 has, for example, a memory 1010 and a CPU 1020. Further, the computer 1000 has a hard disk drive interface 1030, a disk drive interface 1040, a serial port interface 1050, a video adapter 1060, and a network interface 1070. These components are connected via a bus 1080.

The memory 1010 includes a read only memory (ROM) 1011 and a RAM 1012. The ROM 1011 stores, for example, a boot program such as basic input output system (BIOS). The hard disk drive interface 1030 is connected to a hard disk drive 1090. The disk drive interface 1040 is connected to a disk drive 1100. For example, a detachable storage medium such as a magnetic disk or an optical disk is inserted into the disk drive 1100. The serial port interface 1050 is, for example, connected to a mouse 1110 and a keyboard 1120. The video adapter 1060 is, for example, connected to a display 1130.

The hard disk drive 1090 stores, for example, an OS 1091, an application program 1092, a program module 1093, and program data 1094. That is, the program that defines processing of the generation device 10 is implemented as the program module 1093 in which codes that can be executed by a computer are described. The program module 1093 is, for example, stored in the hard disk drive 1090. For example, the program module 1093 for executing the same processing as the function configuration of the generation device 10 is stored in the hard disk drive 1090. The hard disk drive 1090 may be replaced by an SSD.

Further, the setting data to be used in the processing of the above-described embodiments is stored as the program data 1094, for example, in the memory 1010 or the hard disk drive 1090. The CPU 1020 reads the program module 1093 or the program data 1094 stored in the memory 1010 or the hard disk drive 1090 into the RAM 1012, as needed, and executes the processing of the above-described embodiments.

The storage destination of the program module 1093 and the program data 1094 is not limited to the hard disk drive 1090. For example, they may be stored in a detachable storage medium, and may be read by the CPU 1020 via the disk drive 1100 or the like. Alternatively, the program module 1093 and the program data 1094 may be stored in another computer connected via a network such as local area network (LAN) or wide area network (WAN). Further, the CPU 1020 may read the program module 1093 and the program data 1094 from another computer via the network interface 1070.

REFERENCE SIGNS LIST

U1, U2 User
10 Generation device
20 Object device
100a Pad diagram
100b Table of contents
101 Pad diagram edit unit
102 Procedure manual edit unit
103 Table-of-contents customization unit
104 Device state acquisition unit
105 Table-of-contents display unit
151 Pad diagram accumulation unit
152 Procedure manual accumulation unit

The invention claimed is:

1. A generation device comprising:
a processor; and
a memory device storing instructions that, when executed by the processor, configure the processor to:
extract elements in order from top to bottom from a problem analysis diagram (PAD), wherein each element comprises content of an operation of an object device and an execution condition of the operation, wherein each element is a sequential element or a selection element, which is determined based on a shape of each element;

in response to an element being the sequential element, add, to a table of contents of a manual, an operation of the sequential element regardless of a state of the object device;

in response to the element being the selection element, determine whether the state of the object device satisfies an execution condition of an operation of the selection element; and add, to the table of contents of the manual, the operation of the selection element in response to the state of the object device satisfying the execution condition.

2. The generation device according to claim 1, wherein the selection element is a first type element including an operation to be executed either when an execution condition relating to the state of the object device is satisfied or when the execution condition is not satisfied, a second type element including an operation to be executed for each case of when an execution condition relating to the state of the object device is satisfied and when the execution condition is not satisfied, or a third type element including an operation to be executed when each of multiple execution conditions relating to the state of the object device is satisfied, among the extracted elements.

3. The generation device according to claim 2, wherein the selection element is associated with installation of a predetermined program, the processor is configured to:

determine whether the predetermined program is installed on the object device, and add, to the table of contents of the manual, an operation for installing the predetermined program in response to the predetermined program being not installed on the object device.

4. The generation device according to claim 3, wherein the selection element is associated with a type of operating system (OS), the processor is configured to:

determine the type of OS running on the object device, and add, to the table of contents of the manual, an operation for a particular type of the OS running on the object device.

5. A non-transitory computer readable medium storing a program, wherein executing of the program causes a computer to function as the generation device according to claim 3.

6. The generation device according to claim 1, wherein the selection element is associated with installation of a predetermined program, the processor is configured to:

determine whether the predetermined program is installed on the object device, and add, to the table of contents of the manual, an operation for installing the predetermined program in response to the predetermined program being not installed on the object device.

7. The generation device according to claim 4, wherein the selection element is associated with a type of operating system (OS), the processor is configured to:

determine the type of OS running on the object device, and add, to the table of contents of the manual, an operation for a particular type of the OS running on the object device.

8. A non-transitory computer readable medium storing a program, wherein executing of the program causes a computer to function as the generation device according to claim 6.

9. The generation device according to claim 1, wherein the selection element is associated with a type of operating system (OS), the processor is configured to:

determine the type of OS running on the object device, and add, to the table of contents of the manual, an operation for a particular type of the OS running on the object device.

10. A non-transitory computer readable medium storing a program, wherein executing of the program causes a computer to function as the generation device according to claim 9.

11. A non-transitory computer readable medium storing a program, wherein executing of the program causes a computer to function as the generation device according to claim 1.

12. The generation device according to claim 1, wherein the processor is further configured to edit the PAD based on a user operation.

13. The generation device according to claim 1, wherein the selection element is represented by a pentagon having a concave angle in the PAD.

14. A generation method executed by a generation device, comprising:

extracting elements in order from top to bottom from a problem analysis diagram (PAD), wherein each element comprises content of an operation of an object device and an execution condition of the operation, wherein each element is a sequential element or a selection element, which is determined based on a shape of each element;

in response to an element being the sequential element;

adding, to a table of contents of a manual, an operation of the sequential element regardless of a state of the object device;

in response to the element being the selection element, determining whether the state of the object device satisfies an execution condition; and adding, to the table of contents of the manual, the operation of the selection element in response to the state of the object device satisfying the execution condition.

* * * * *